United States Patent
Izumida et al.

(10) Patent No.: US 7,005,106 B2
(45) Date of Patent: Feb. 28, 2006

(54) LEAD-FREE SOLDER ALLOY AND ELECTRONIC COMPONENTS USING IT

(75) Inventors: Koichi Izumida, Tokyo (JP); Yuki Takano, Tokyo (JP); Hitoshi Abe, Tokyo (JP); Toshiyuki Moribayashi, Osaka (JP); Koichi Hagio, Osaka (JP); Junichi Takenaka, Osaka (JP)

(73) Assignees: Sumida Corporation, Tokyo (JP); Nihon Genma Mfg. Co., Ltd., Osaka (JP)

(*) Notice: Subject to any disclaimer, the term of this patent is extended or adjusted under 35 U.S.C. 154(b) by 0 days.

(21) Appl. No.: 10/433,461

(22) PCT Filed: Aug. 30, 2001

(86) PCT No.: PCT/JP01/07488

§ 371 (c)(1),
(2), (4) Date: Jun. 3, 2003

(87) PCT Pub. No.: WO03/020468

PCT Pub. Date: Mar. 13, 2003

(65) Prior Publication Data

US 2004/0126270 A1 Jul. 1, 2004

(51) Int. Cl.
*B23K 35/26* (2006.01)
(52) U.S. Cl. ............ 420/560; 420/561; 148/400
(58) Field of Classification Search .......... 148/400; 420/560–561

See application file for complete search history.

(56) References Cited

U.S. PATENT DOCUMENTS

| 4,758,407 A | | 7/1988 | Ballentine et al. |
| 4,821,142 A | * | 4/1989 | Ushifusa et al. ............ 361/739 |
| 4,962,066 A | * | 10/1990 | Starz et al. ................... 501/19 |
| 6,319,461 B1 | * | 11/2001 | Domi et al. ................. 420/557 |

FOREIGN PATENT DOCUMENTS

| EP | 0 985 486 | 3/2000 |
| JP | 11 077366 | 3/1999 |
| JP | 3036636 | 2/2000 |
| JP | 2000 190090 | 7/2000 |
| JP | 2000 343273 | 12/2000 |
| JP | 2001 334384 | 12/2001 |

* cited by examiner

Primary Examiner—Sikyin Ip
(74) Attorney, Agent, or Firm—Sherman & Associates

(57) ABSTRACT

Prevented is disconnection, and generation of the bridging effect which causes short circuits between terminals, when electric wire having an insulating coating and terminals are soldered together, in electronic components which are constituted using electric wire having an insulating coating, the core wire thereof being copper or a copper alloy, and in which electronic components distances between neighboring terminals are narrow.

Electric wire having an insulating coating, the base metal of which is copper, and terminal portions (connection portions) are soldered together by means of a lead-free solder alloy, which contains 3.0 to 5.5 wt % copper (Cu); 0.1 to 0.5 wt % nickel (Ni); and 0.001 to 0.1 wt % germanium (Ge), the remainder of the solder alloy consisting of tin (Sn).

3 Claims, 1 Drawing Sheet

LEAD-FREE SOLDER ALLOY AND ELECTRONIC COMPONENTS USING IT

TECHNICAL FIELD

The present invention relates to a solder alloy which does not contain lead (Pb), and specifically to a lead-free solder alloy and electronic components using it.

BACKGROUND ART

In the past, tin (Sn)-lead (Pb)-type solder alloys containing large quantities of lead have been heavily used as solder for electrical connections inside electronic components, or for connecting electronic components to a circuit board.

Recently, the harmful effects of lead have been viewed as a problem, and legally restricting its use has been considered. For these reasons, development is being speeded up of a solder alloy with an extremely low lead content, or a lead-free solder alloy containing absolutely no lead ingredients as a substitute for Sn—Pb-type solder alloy.

Japanese Patent No. 3036636 and U.S. Pat. No. 4,758,407 can be cited as examples of lead-free solder alloys.

Patent No. 3036636 relates to a lead-free solder alloy for attaching electronic components to a circuit board of an electronic device, with nickel (Ni) substituted for a portion of the copper ingredient of the tine (Sn)-copper (Cu) alloy, aimed at enhancing the mechanical strength of the aforementioned attached portions by bringing the ingredient ratios to 0.05 to 2.0 wt % of Cu and 0.001 to 2.0 wt % of Ni, with the remainder consisting of Sn.

As previously described, this solder alloy is used in reflow soldering for attaching electronic components to the conducting portion of a circuit board, and the service temperature (temperature at the time of soldering) thereof is approximately 230° C.

U.S. Pat. No. 4,758,407 also proposes the use of copper pipe and brass pipe in plumbing, to inhibit the release of lead and cadmium into drinking water from lead piping used in plumbing, and this patent relates to a solder alloy for welding these copper pipes and brass pipes with the connecting joints for extending them.

This solder alloy also has tin (Sn), or tin (Sn) and antimony (Sb) as its main ingredients, and never contains lead (Pb) or cadmium (Cd).

In this case, the solder alloy that primarily comprises tin is composed of 92.5 to 96.9 wt % Sn, 3.0 to 5.0 wt % 0.1 to 2.0 wt % Ni, and 0.0 to 5.0 wt % Ag.

Also, the solder alloy that primarily comprises tin and antimony is composed of 87.0 to 92.9 wt % Sn, 4.0 to 6.0 wt % Sb, 3.0 to 5.0 wt % Cu, 0.0 to 2.0 wt % Ni, and 0.0 to 5.0 wt % Ag.

The melting temperature of this solder alloy is from about 240° C. to about 330° C., but because this solder alloy is used, for example, to weld copper pipes, brass pipes, and joints thereof in the water supply lines of household water heaters, it is better for the solder alloy to have a low melting temperature when considering workability and the like during welding.

In addition, electronic components include high-frequency coils and transformers (hereafter referred to as coil components) formed by coiling wire-shaped or narrow band-shaped electric conductors (hereafter referred to as winding wire). Insulation-coated electric wire obtained by applying enamel, urethane, or the like to a copper core wire to form an insulating film is used as the coiled wire material for these coil components.

The abovementioned coil components are soldered in order to electrically connect the outgoing end portion of the winding wire wrapped around a bobbin or the like to a terminal pin or other electrode portion provided in the bobbin. To electrically connect the terminal pin or the like with the end portion of the winding wire, the insulating coating material on the aforementioned end portion of the winding wire must be removed. In general, methods for removing the insulating coating material on the aforementioned insulation-coated electric wire include mechanical scraping methods, chemical dissolution methods, and methods of decomposition or dissolution by high-temperature heating.

Methods that employ high-temperature heating are widely used in conventional practice.

The coil components are manufactured by wrapping the end portion of the winding wire onto the terminal pin and dipping the wrapped part in a bath of liquid solder heated to high temperature, and soldering is performed at the same time as the insulating coating material of the winding wire is dissolved and removed by the heat of the solder liquid.

During soldering of the aforementioned wrapped portion of the end portion with the terminal pin, a phenomenon known as "copper erosion" occurs when a lead-free solder alloy that contains no copper ingredient is used. In this phenomenon, the copper base metal of the insulation-coated electric wire (winding wire) dissolves in the solder liquid and becomes thin while the aforementioned wrapped portion is in contact with the molten solder (solder liquid). This "copper erosion" phenomenon is a major contributing factor to the occurrence of accidental wire breakage in electronic components such as the abovementioned coil components.

By this effect, the quantity of copper that melts into the aforementioned solder liquid increases, and the speed of copper melting increases, in direct proportion to the melting temperature of the solder liquid. Consequently, the abovementioned accidental wire breakage becomes more likely with a reduction in the wire diameter of the winding wire.

On the other hand, means for adding a trace quantity of copper to the aforementioned lead-free solder alloy are generally known for inhibiting the "copper erosion" phenomenon, but if the copper content is too large, the viscosity of the molten solder (solder liquid) becomes high, and an excessive amount of solder is applied to the soldered parts between neighboring terminals and the like during soldering, leading to bridging phenomena wherein these terminals electrically short, unevenness in plating thickness (quantity of applied solder), deterioration of wetting characteristics, and other defects.

Bridging effects become more likely as the electronic components become more miniaturized, and the distances (pitch) between neighboring terminals become more narrow.

However, if the melting temperature of the molten solder is lowered to reduce the aforementioned "copper erosion" in the lead-free solder alloy, the enamel, urethane, or other insulating coating material of the end portion of the winding wire does not completely dissolve, the residue of the aforementioned coating material is deposited on the aforementioned wrapped part, and soldering is left incomplete, contributing to conduction defects. The aforementioned residue is also a contributing factor to the abovementioned bridging.

The inventors discovered that "copper erosion" could be prevented, and the post-soldering mechanical strength of the lead-free solder alloy increased, by first adding nickel (Ni) in a lead-free solder alloy obtained by adding appropriate quantities of copper (Cu) and nickel (Ni) to tin (Sn).

However, it is preferable to increase the copper content of this lead-free solder alloy as well to adequately prevent the "copper erosion" phenomenon, but as the copper content increases, the viscosity of the solder alloy when melted becomes high, and dispersion of the solder liquid deteriorates. Consequently, bridging effects are likely to occur in the soldering of electronic components such as miniature coil components with narrow distances (pitch) between neighboring terminals such as those described above.

Therefore, an object of the present invention is to provide a lead-free solder alloy that adequately maintains characteristics for suppressing "copper erosion" in a lead-free solder alloy of the tin-copper-nickel type, and in which the viscosity of the molten solder (solder liquid) is lowered.

DISCLOSURE OF THE INVENTION

The present invention relates to a lead-free solder alloy comprising 3.0 to 5.5 wt % of copper (Cu), 0.1 to 0.5 wt % of nickel (Ni), and 0.001 to 0.1 wt % germanium (Ge), and the remainder thereof consisting of tin (Sn).

The present invention also relates to an electronic component using conductors, the core portion of which is formed from copper or a copper-containing alloy, and covered with an insulating coating, said electronic component being characterized in that the conductors are mutually soldered, or the conductors and locations other than the conductors of the electronic component are soldered, with a lead-free solder alloy that comprises 3.0 to 5.5 wt % copper (Cu), 0.1 to 0.5 wt % of nickel (Ni), and 0.001 to 0.1 wt % germanium (Ge), with the remainder thereof consisting of tin (Sn).

Specifically, the present invention relates to a lead-free solder alloy capable of preventing accidental wire breakage caused by a "copper erosion" phenomenon during soldering of a coil component using a lead-free solder alloy, and capable of minimizing the occurrence of bridging phenomena between the terminals of the aforementioned coil component, by setting the added quantity of nickel to a specific range, setting the added quantity of copper to a specific range, and furthermore, adding germanium in a specific range in a lead-free solder alloy obtained by adding copper and nickel to tin.

The lead-free solder alloy of the present invention is suitable for soldering so-called "fine pitch" electronic components, in which the distances between neighboring terminals are narrow, and particularly for soldering conducting wires having an insulating coating, or for soldering other locations with conducting wires having an insulating coating in electronic components that use conducting wires having an insulating coating, in which the core wire thereof comprises copper or a copper-containing alloy, with an insulating coating disposed on the surface thereof.

BRIEF DESCRIPTION OF THE DRAWINGS

FIGS. 1, 2, and 3 are descriptive diagrams depicting an example of a coil component, wherein FIG. 1 shows a rear view of the coil component, FIG. 2 is a magnified view showing part of the electric wire connecting portion of a terminal, and FIG. 3 is a magnified view of a part in which a state of solder bridging has occurred.

BEST MODE FOR CARRYING OUT THE INVENTION

Figure 1:
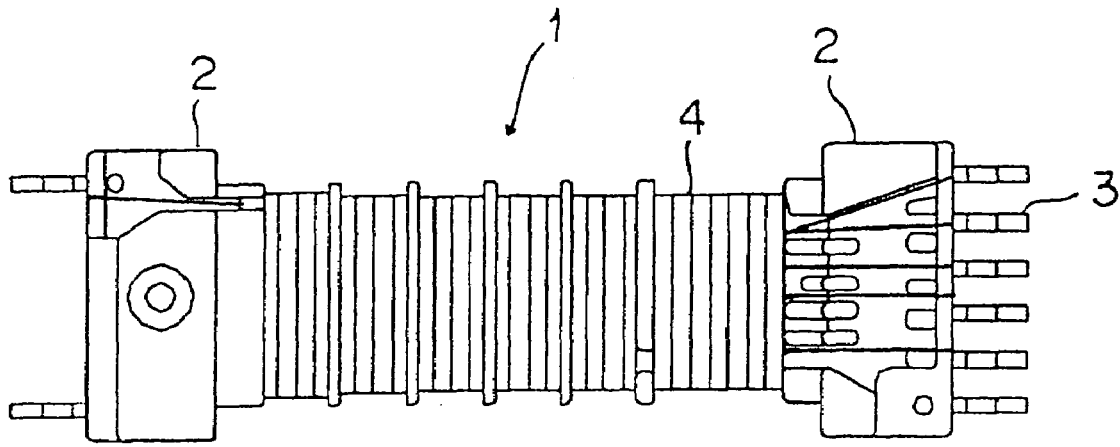
Figure 2:
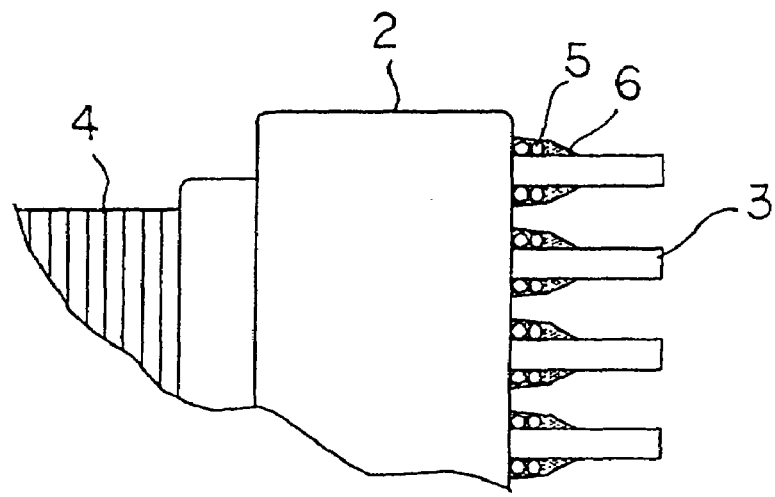
Figure 3:
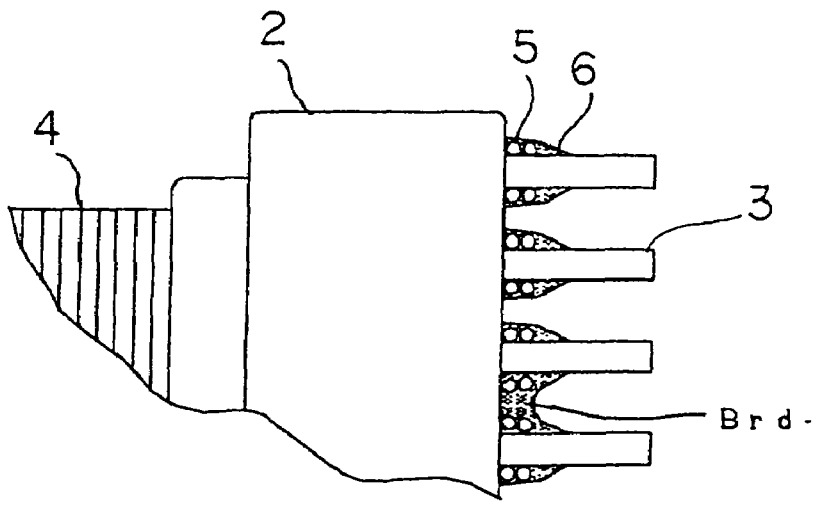

An example of a coil component that uses an insulation-coated copper wire obtained by applying enamel or urethane to a copper core wire to form an insulating coating is depicted as a coiled wire material in FIGS. 1, 2, and 3.

In FIGS. 1, 2, and 3, 1 is the bobbin of a high-frequency transformer, which is provided with a terminal block 2 on the two opposing ends thereof. 3 are terminal pins implanted in a line along the terminal block 2 at specific intervals; 4 is insulation-coated electric wire (winding wire) winded around the bobbin 1; and 5 is a outgoing end of the insulation-coated electric wire 4, each of which are wrapped onto the base portions of the terminal pins 3 lined up on the terminal block 2. The end portions 5 and the terminal pins 3 are electrically connected by the solder 6.

Brd in FIG. 3 depicts a state of bridging that occurs when excess solder is deposited between neighboring terminal pins 3. An HCP wire obtained by coating the surface of a steel core wire with copper plating, or an CP wire obtained by coating the surface of an iron core wire with copper plating, is often used in the terminal pins 3.

The insulation-coated material of the end portions 5 must be removed in order to electrically connect the terminal pins 3 with the end portions 5 of the winding wire. Methods for removing the insulating coating material include, as previously described, mechanical scraping methods, chemical dissolution methods, and methods of decomposition or dissolution by high-temperature heating. A method for dissolving and removing by high-temperature heating is employed in the present invention.

Specifically, after the end portions 5 of the winding wire 4 have been wrapped onto the terminal pins 3, soldering is performed at the same time as the insulating coating of the winding wire is dissolved and removed by dipping the wrapped portion into a solder bath.

Embodiments

Table 1 shows the relationship between the ratio of bridging occurrence between terminals and the compositional content of the solder alloy in FIGS. 1, 2, and 3 when a sample comprising a bobbin of a high-frequency transformer was dipped into molten solder liquid at a high temperature (430° C.). In the sample, enamel-coated copper wire with a diameter of 0.35 mm was used as the winding wire 4, hoop-shaped CP wire obtained by plating an iron core portion with copper was used as the material for the terminal pin 3, the width of the terminal pins 3 was 0.5 mm, and the interval (pitch) between neighboring terminals was 1.0 mm.

The column labeled "potential for correction by re-soldering" in Table 1 shows whether bridging in samples in which bridging occurred when they were initially dipped in molten solder liquid can be eliminated by once again dipping in molten solder liquid.

The melting temperature of the solder alloy was approximately 350° C. when germanium (Ge) was added to a lead-free solder alloy of the tin (Sn)-copper (Cu)-nickel (Ni) type.

However, the molten solder temperature (soldering temperature) of the lead-free solder alloy must be 350° C. or above in order to remove the enamel coating of an enamel-coated copper wire, as an example of insulation-coated electric wire used in the winding wire of the coil components, so it is appropriate to set the molten solder temperature (soldering temperature) of the lead-free solder alloy to about 400° C. in order to reliably dissolve the insulating coating material of the copper wire having an insulating coating when soldering electronic components that use the copper wire having an insulating coating. In the present embodiment, the molten solder temperature (soldering temperature) of the lead-free solder alloy was set to 430° C.

TABLE 1

(MOLTEN SOLDER TEMPERATURE: 430° C.)

| SOLDER ALLOY COMPOSITION | | | | RATIO IN WHICH BRIDGING OCCURRED (SAMPLE: NUMBER OUT OF 5) | POTENTIAL FOR CORRECTION BY RE-SOLDERING (YES: ○ NO: x) |
|---|---|---|---|---|---|
| Sn- | 2Cu- | 0.2Ni | | NO BRIDGING IN ANY SAMPLE | ○ |
| Sn- | 3Cu- | 0.2Ni | | 1 | ○ |
| Sn- | 5Cu- | 0.2Ni | | BRIDGING IN ALL SAMPLES | X |
| Sn- | 6Cu- | 0.2Ni | | BRIDGING IN ALL SAMPLES | X |
| Sn- | 2Cu- | 0.05Ge | | 3 | ○ |
| Sn- | 3Cu- | 0.05Ge | | 4 | ○ |
| Sn- | 6Cu- | 0.05Ge | | BRIDGING IN ALL SAMPLES | X |
| Sn- | 2Cu- | 0.2Ni- | 0.001Ge | NO BRIDGING IN ANY SAMPLE | ○ |
| Sn- | 2Cu- | 0.2Ni- | 0.05Ge | NO BRIDGING IN ANY SAMPLE | ○ |
| Sn- | 3Cu- | 0.2Ni- | 0.001Ge | 2 | ○ |
| Sn- | 3Cu- | 0.2Ni- | 0.002Ge | 1 | ○ |
| Sn- | 3Cu- | 0.2Ni- | 0.005Ge | 1 | ○ |
| Sn- | 3Cu- | 0.2Ni- | 0.01Ge | NO BRIDGING IN ANY SAMPLE | ○ |
| Sn- | 3Cu- | 0.2Ni- | 0.02Ge | NO BRIDGING IN ANY SAMPLE | ○ |
| Sn- | 3Cu- | 0.1Ni- | 0.02Ge | NO BRIDGING IN ANY SAMPLE | ○ |
| Sn- | 3Cu- | 0.2Ni- | 0.05Ge | NO BRIDGING IN ANY SAMPLE | ○ |
| Sn- | 3Cu- | 0.2Ni- | 0.1Ge | NO BRIDGING IN ANY SAMPLE | ○ |
| Sn- | 3Cu- | 0.5Ni- | 0.02Ge | NO BRIDGING IN ANY SAMPLE | ○ |
| Sn- | 5Cu- | 0.2Ni- | 0.001Ge | NO BRIDGING IN ANY SAMPLE | ○ |
| Sn- | 5Cu- | 0.2Ni- | 0.002Ge | 1 | ○ |
| Sn- | 5Cu- | 0.2Ni- | 0.01Ge | 1 | ○ |
| Sn- | 5Cu- | 0.2Ni- | 0.02Ge | 1 | ○ |
| Sn- | 5.5Cu- | 0.2Ni- | 0.02Ge | NO BRIDGING IN ANY SAMPLE | ○ |
| Sn- | 5Cu- | 0.2Ni- | 0.03Ge | NO BRIDGING IN ANY SAMPLE | ○ |
| Sn- | 5Cu- | 0.2Ni- | 0.05Ge | NO BRIDGING IN ANY SAMPLE | ○ |
| Sn- | 5Cu- | 0.2Ni- | 0.1Ge | NO BRIDGING IN ANY SAMPLE | ○ |
| Sn- | 6Cu- | 0.2Ni- | 0.05Ge | BRIDGING IN ALL SAMPLES | X |
| Sn- | 6Cu- | 0.2Ni- | 0.1Ge | BRIDGING IN ALL SAMPLES | X |

Also, Table 2 contains measurement results showing the relationship between the number of times dipped before the iron substrate (core portion) of the CP wire became visible and changed color, and the solder alloy composition and compositional content when the CP wire used in the terminal pins 3 was dipped in high-temperature (430° C.) molten solder liquid.

Specifically, Table 2 shows the relationship between the content of components in the solder alloy composition and the magnitude of "copper erosion," and shows that "copper erosion" decreases in inverse proportion to the number of dips. The number of dips in Table 2 is preferably 10 or more.

because the viscosity of the molten solder liquid is adjusted, the molten solder liquid is smoothed, and liquid dispersion improves.

In this case, the ratio of bridging occurrence can be considerably minimized and the initially formed bridging can be reduced by re-soldering when the copper content is in a specified range, and the germanium (Ge) content is at least 0.001 wt % or above. However, the ratio of bridging occurrence cannot be reduced and the initially formed bridging cannot be eliminated by re-soldering in a range in which the copper content exceeds the specified upper limit, even if the germanium (Ge) content is increased.

TABLE 2

(MOLTEN SOLDER TEMPERATURE; 430° C.)

| SOLDER ALLOY COMPOSITION | | | NUMBER OF TIMES UNTIL THE TERMINAL SURFACE CHANGES COLOR DURING REPEATED SOLDERING |
|---|---|---|---|
| Sn- | 2Cu- | 0.2Ni | 1 |
| Sn- | 3Cu- | 0.2Ni | 10 |
| Sn- | 5Cu- | 0.2Ni | 20 OR MORE |
| Sn- | 6Cu- | 0.2Ni | 20 OR MORE |
| Sn- | 2Cu- | 0.05Ge | 1 |
| Sn- | 3Cu- | 0.05Ge | 4 |
| Sn- | 6Cu- | 0.05Ge | 7 |
| Sn- | 2Cu- | 0.2Ni- 0.001Ge | 2 |
| Sn- | 2Cu- | 0.2Ni- 0.05Ge | 2 |
| Sn- | 3Cu- | 0.2Ni- 0.001Ge | 10 |
| Sn- | 3Cu- | 0.2Ni- 0.002Ge | 10 |
| Sn- | 3Cu- | 0.2Ni- 0.005Ge | 10 |
| Sn- | 3Cu- | 0.2Ni- 0.01Ge | 11 |
| Sn- | 3Cu- | 0.2Ni- 0.02Ge | 10 |
| Sn- | 3Cu- | 0.1Ni- 0.02Ge | 10 |
| Sn- | 3Cu- | 0.2Ni- 0.05Ge | 10 |
| Sn- | 3Cu- | 0.2Ni- 0.1Ge | 10 |
| Sn- | 3Cu- | 0.5Ni- 0.02Ge | 20 |
| Sn- | 5Cu- | 0.2Ni- 0.001Ge | 20 OR MORE |
| Sn- | 5Cu- | 0.2Ni- 0.002Ge | 20 OR MORE |
| Sn- | 5Cu- | 0.2Ni- 0.01Ge | 20 OR MORE |
| Sn- | 5Cu- | 0.2Ni- 0.02Ge | 20 OR MORE |
| Sn- | 5.5Cu- | 0.2Ni- 0.02Ge | 20 OR MORE |
| Sn- | 5Cu- | 0.2Ni- 0.03Ge | 20 OR MORE |
| Sn- | 5Cu- | 0.2Ni- 0.05Ge | 20 OR MORE |
| Sn- | 5Cu- | 0.2Ni- 0.1Ge | 20 OR MORE |
| Sn- | 6Cu- | 0.2Ni- 0.05Ge | 20 OR MORE |
| Sn- | 6Cu- | 0.2Ni- 0.1Ge | 20 OR MORE |

As is clear from Table 1 above, when the nickel content was made constant and the copper content was varied in a lead-free solder alloy of the tin (Sn)-copper (Cu)-nickel (Ni) type, the viscosity of the solder liquid increased, the ratio of bridging occurrence between neighboring terminals increased, and the initially formed bridging could not be eliminated by re-soldering when the copper content was increased.

When germanium (Ge) was added to a lead-free solder alloy of the tin (Sn)-copper (Cu)-nickel (Ni) type having a specific nickel (Ni) content, and the copper content and germanium content were each varied, almost no bridging occurred when the germanium content was equal to or above a constant value (0.001 wt %), and the copper content was 5.5 wt % or less.

Thus, by containing at least 0.001 wt % germanium (Ge) in a lead-free solder alloy of the tin (Sn)-copper (Cu)-nickel (Ni) type that contains nickel (Ni) in a specific range, the ratio of bridging between terminals can be minimized Also, there was no apparent change in the occurrence ratio of bridging when the copper content was made constant, even with the germanium (Ge) content raised above 0.1 wt %.

The quantity of suspended solids (copper/nickel deposits) present in the molten solder fluid varied according to the germanium (Ge) content, and the quantity of suspended solids in the molten solder fluid increased in the absence of germanium (Ge). These suspended solids were deposited to the surfaces of soldered portions, the soldered portions roughened, and a uniform solder thickness was difficult to achieve. Bridging effects were also more likely to occur.

According to Table 2, the "copper erosion" ratio can also be adjusted according to the nickel content of the lead-free solder alloy. Specifically, the size of the "copper erosion" in a lead-free solder alloy of the tin (Sn)-copper (Cu) type is controlled by the copper content, wherein the tendency is for "copper erosion" to increase in a range in which the copper content is not low, and for "copper erosion" to decrease in a range in which the copper content is low, although "copper erosion" can still be reduced in the range with a low copper content when the nickel content is increased. "Copper erosion" can also be suppressed at a low nickel content in a range in which the copper content is high. The germanium (Ge) content and the aforementioned size of the "copper erosion" apparently have no correlation.

INDUSTRIAL APPLICABILITY

As described above with reference to the lead-free solder alloy of the present invention, "copper erosion" is unlikely to occur even in a high temperature range during soldering, making it possible to prevent accidental wire breakage during soldering of electronic components that use insulation-coated conductors whose core wires are made of copper or a copper-containing alloy, to provide low viscosity and high solder liquid dispersibility, and to prevent the occurrence of bridging effects in which the space between terminals is shorted by solder during soldering of electronic components for which the intervals between neighboring terminals are narrow.

The invention claimed is:

1. A lead-free tin(Sn)-copper(Cu)-nickel(Ni) type solder alloy consisting essentially of 3.0 to 5.5 wt % of copper(Cu), 0.1 to 0.5 wt % of nickel(Ni), 0.001 to 0.1 wt % of germanium(Ge) and tin(Sn).

2. An electronic component using conductors, the core portion of which is formed from copper or a copper-containing alloy, and covered with an insulating coating, said electronic component being characterized in that the conductors are mutually soldered, or the locations other than the conductors of the electronic component are soldered, with a lead-free tin(Sn)-copper(Cu)-nickel(Ni) type solder alloy consisting essentially of 3.0 to 5.5 wt % of copper(Cu), 0.1 to 0.5 wt % of nickel(Ni), 0.001 to 0.1 wt % of germanium(Ge) and tin(Sn).

3. A lead-free tin(Sn)-copper(Cu)-nickel(Ni) type solder alloy according to claim 1, wherein the solder alloy is used to a dip-soldering process.

* * * * *